Patented Sept. 27, 1932

1,879,090

UNITED STATES PATENT OFFICE

FRANCIS EDWARD CISLAK, OF INDIANAPOLIS, INDIANA, ASSIGNOR TO PETER C. REILLY, OF INDIANAPOLIS, INDIANA

METHOD OF PURIFYING ANTHRACENE AND OTHER SUBSTANCES

No Drawing. Application filed July 7, 1930. Serial No. 466,047.

My invention relates to the purification of anthracene, and incidentally to the concentration and purification of phenanthrene and carbazole.

It is the object of my invention to effect the purification of anthracene, in a simple manner, and as an incident thereto to obtain at the same time concentrated phenanthrene and carbazole.

As anthracene is obtained in the crude form from coal-tar, and even when it is fairly well purified, it has mixed with it varying quantities of contaminants which are separated with it from such coal-tar. The main ones of these contaminants are methyl anthracene, benzo-carbazole, paraffin, phenanthrene, and carbazole; of which the last two occur in the largest portions. These contaminating substances of anthracene have heretofore been rather difficult to separate from it, and such separation has involved rather large expense.

I have discovered that there is a marked differential solubility of anthracene on the one hand and phenanthrene and carbazole on the other hand, in 4-hydroxy-4-methyl-2-pentanone. This differential solubility I have found to be particularly marked at a temperature in the neighborhood of 25° C. At that temperature and thereabouts, I have found that anthracene is materially less soluble in 4-hydroxy-4-methyl-2-pentanone than are phenanthrene and carbazole.

By taking advantage of this differential solubility, I have found it possible to purify anthracene simply and inexpensively. For instance, by starting with a crude anthracene that contains only 15 to 20% of anthracene, I have found that by two recrystallizations from this solvent I am able to obtain an anthracene of about 95% purity. The number of recrystallizations used depends upon the composition of the original product, and on the extent of purification desired.

The following is an example of this purification:

One part of a crude anthracene, of between 50 and 60% purity, is dissolved in five parts of 4-hydroxy-4-methyl-2-pantanone, at a temperature of about 100° C. When solution is complete, the solution is allowed to cool, desirably to about 25° C., or somewhere in the range from 15° to 35° C.; upon which cooling certain crystals appear. These crystals are separated from the solution, as for example by filtering, centrifuging, or decanting. The crystalline mass is an anthracene of about 84–85% purity; and the yield is usually about 90–95% of the theoretical.

For many uses, the anthracene just obtained is of sufficient purity, without further purification. However, if further purification is desired, the product of the first recrystallization is again dissolved in 4-hydroxy-4-methyl-2-pentanone, desirably by heating to 100° C. This time it is usually necessary to use more of the solvent, about 10 parts, in order to obtain complete solution. When solution is complete, the solution is allowed to cool as before, desirably to about 25° C. or within 10° thereof on either side; and crystals appear. These are separated from the solution as before, yielding an antharcene of about 94–96% purity. The yield on this second recrystallization is usually about 89–91% of the theoretical.

If still further purification is desired, the process of dissolving and recrystallizing may be repeated as often as desired. Generally speaking, the purity of the anthracene is increased at each recrystallization, while the yield is decreased.

The purities and yields which are given above are given as examples only, and the invention is in no way limited to them.

In performing this process of alternate dissolving and recrystallizing, the phenanthrene and carbazole which were present as contaminants of the anthracene remain for most part in solution, on account of the differential solubility already referred to. These may be separated from the solvent, as for example by distillation or crystallization; and at the same time the solvent is recovered for further use. The phenanthrene and the carbazole are thus obtained in more concentrated form than they were originally.

Instead of obtaining the fractional crystallization by varying the temperature, it is possible to obtain it by distillation or partial evaporation. I believe that it is best to carry out the partial evaporation in the neighborhood of 25° C., by evaporating under vacuum, as there is a marked differential solubility at that temperature and in the vicinity thereof. If such recrystallization is obtained by evaporation, the anthracene comes down in purer form at the higher volume, and decreases in purity as the volume of the solution is decreased; so that it is desirable to remove the crystals of anthracene that are formed before the evaporation has been carried too far, in order to obtain the desired purification of the anthracene.

It is also possible, although less desirable, to obtain the separation of the anthracene from the contaminating phenanthrene and carbazole, by grinding the crystals of the mixed product to fine form, and then extracting with 4-hydroxy-4-methyl-2-pentanone. If this is done carefully at about 25° or 30° C., with not more than five or six parts of the solvent and with efficient stirring, it is found that the contaminants, especially phenanthrene and carbazole, are to a large extent dissolved by the solvent, while most of the anthracene remains undissolved in a purified form.

However, I prefer the process involving dissolving the anthracene to be purified in a sufficient quantity of 4-hydroxy-4-methyl-2-pentanone to obtain substantially complete solution at a rather high temperature, and then lowering the temperature of the solution to obtain recrystallization of the anthracene while leaving most of the contaminants in solution.

In thus purifying the anthracene of phenanthrene and carbazole by reason of their differential solubility, I also purify it to a large extent from its other contaminants, which are present in smaller quantities, even though their solubility in this solvent is not so different from that of anthracene as is that of phenanthrene and carbazole.

This same solvent may also be used in the same way to separate anthracene from mixtures of it with other substances having a different solubility in it from that of anthracene.

I claim as my invention:—

1. The process of purifying anthracene, which consists in treating with 4-hydroxy-4-methyl-2-pentanone anthracene which contains contaminants that are separated with it from coal-tar, and utilizing the solvent-power of said solvent to produce separation of purified anthracene from such contaminants.

2. The process of purifying anthracene from phenanthrene and carbazole, which consists in treating a mixture of such substances with 4-hydroxy-4-methyl-2-pentanone to obtain a purified anthracene in solid form and a solution of said phenanthrene and carbazole, and separating the purified anthracene from the solution.

3. The process of purifying anthracene, which consists in dissolving in 4-hydroxy-4-methyl-2-pentanone at an elevated temperature anthracene which contains contaminants that are separated with it from coal-tar, and producing recrystallization of anthracene from the solution at a lower temperature.

4. The process of purifying anthracene, which consists in dissolving in 4-hydroxy-4-methyl-2-pentanone anthracene which contains contaminants that are separated with it from coal-tar, and producing recrystallization of anthracene from the solution.

5. The method of concentrating carbazole and phenanthrene, and substantially separating them from anthracene, which consists in dissolving a mixture of these materials in 4-hydroxy-4-methyl-2-pentanone, and recrystallizing anthracene therefrom.

6. The method of purifying anthracene from contaminants which at low temperatures are more soluble than it is in 4-hydroxy-4-methyl-2-pentanone, which consists in dissolving such contaminated anthracene in a sufficient amount of 4-hydroxy-4-methyl-2-pentanone at an elevated temperature to obtain complete solution, and lowering the temperature of the solution to cause recrystallization therefrom of purified anthracene.

7. The method of purifying anthracene from contaminants at about 25° C. are more soluble than it is in 4-hydroxy-4-methyl-2-pentanone, which consists in dissolving such contaminated anthracene in 4-hydroxy-4-methyl-2-pentanone at about 100° C., and then cooling the solution to about 25° C. to cause the recrystallization therefrom of purified anthracene.

8. The method of purifying crude anthracene, which consists in treating said crude anthracene with 4-hydroxy-4-methyl-2-pentanone to obtain a purified anthracene in solid form and a solution of the contaminants, and separating the purified anthracene from the solution.

9. The use of 4-hydroxy-4-methyl-2-pentanone as a selective solvent to purify anthracene from phenanthrene and carbazole.

In witness whereof, I have hereunto set my hand at Indianapolis, Indiana, this 3d day of July, A. D. one thousand nine hundred and thirty.

FRANCIS EDWARD CISLAK.

CERTIFICATE OF CORRECTION.

Patent No. 1,879,090. September 27, 1932.

FRANCIS EDWARD CISLAK.

It is hereby certified that error appears in the printed specification of the above numbered patent requiring correction as follows: Page 2, line 98, claim 7, after "contaminants" insert the word which; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.